Sept. 1, 1925.
A. J. MOTTLAU
1,552,335
ELECTRIC RADIANT HEATING COVER FOR FOOD CONTAINERS
Filed Feb. 17, 1922
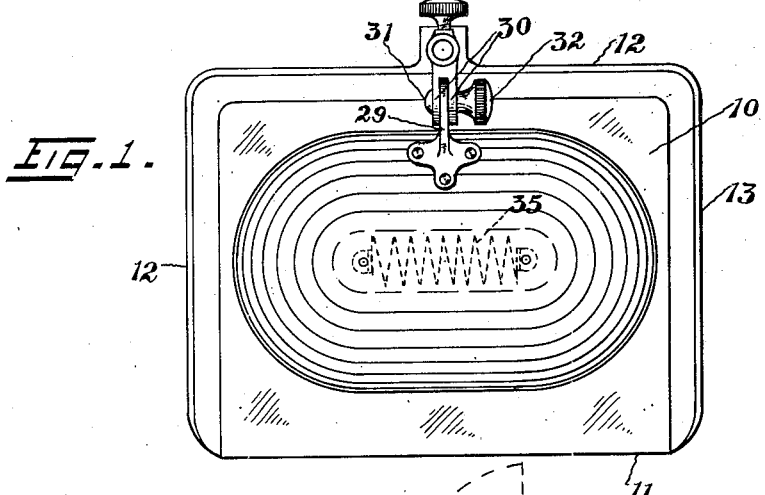
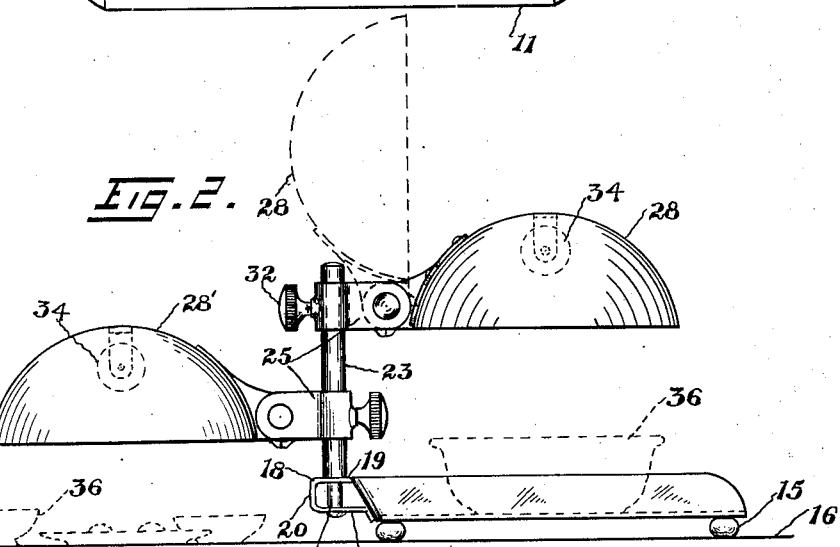
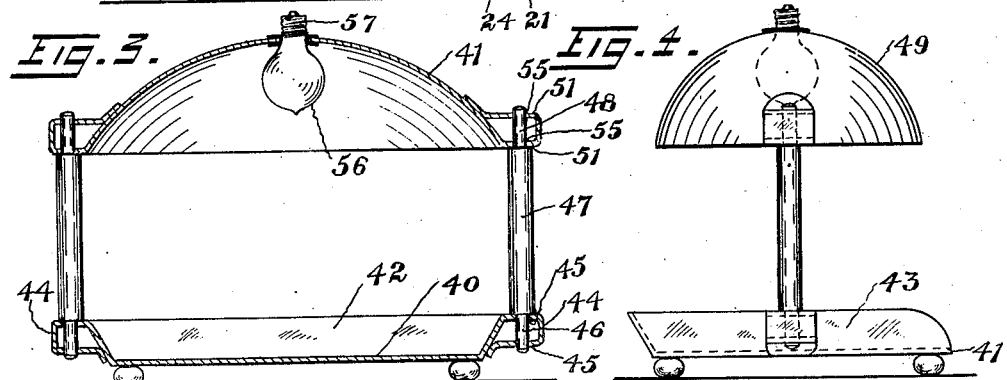
Witnesses:
Inventor:
August J. Mottlau,
By his Atty, Patented Sept. 1, 1925.

1,552,335

UNITED STATES PATENT OFFICE.

AUGUST J. MOTTLAU, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

ELECTRIC RADIANT HEATING COVER FOR FOOD CONTAINERS.

Application filed February 17, 1922. Serial No. 537,291.

*To all whom it may concern:*

Be it known that I, AUGUST J. MOTTLAU, a subject of the King of Denmark, residing in Philadelphia, county of Philadelphia and State of Pennsylvania, have invented certain new and useful Improvements in Electric Radiant Heating Covers for Food Containers, of which the following is a specification.

This invention relates to electrical appliances or radiant heating covers for keeping food warm, as when at a table at meals; though it is noted that the invention is not limited to electrical devices nor even in some respects to table articles.

One object of the invention is to provide an appliance or device of this kind which will conveniently support, and keep warm or hot, food or the like on the table.

Another object of the invention is to provide an apparatus or device of this kind which will protect the table or table cloth from burning by the heat of the appliance.

Another object of the invention is to provide an apparatus or device of this kind which is adjustable in one or several ways for different sizes or positions of utensils or for varying the heating effect.

Other objects of the invention are to improve generally the simplicity and efficiency of such devices and to provide a device or apparatus of this kind which is durable, economical to manufacture and operate and which will not easily get out of order.

Other objects of the invention will appear as the description proceeds; and while herein details of the invention are described, the invention is not limited to these, since many and various changes may be made without departing from the scope of the invention as claimed.

In the acompanying drawing, showing by way of example two of many possible embodiments of the invention, Fig. 1 is a plan of one form of my improved utensil;

Fig. 2 is an end elevation of the same;

Fig. 3 is a longitudinal vertical sectional view, partly in elevation of another form of the invention; and Fig. 4 is an end elevation of the latter.

My improved appliance as shown in Figs. 1 and 2 comprises a wide flat metallic heat resistant tray 10 having an unflanged front edge 11, and upstanding flanges 12 and 13 at the back side and both ends respectively. Feet 15 (Fig. 2) or the like support the tray spaced from a table 16 or other support to prevent injury to the table by heat.

A socket 18 formed on the back flange 12 of the tray comprises a strip formed with horizontally outwardly, downwardly and horizontally inwardly bent portions 19, 20 and 21, the horizontal portions 19 and 21 having vertically alined apertures receiving a standard 23 having a reduced lower end portion 24 received in said apertures.

One or more brackets 25 each provided with a vertical bore vertically and rotatably adjustably received on said standard and held in place by a set screw 26 engaging the standard, carry one or more reflecting domes 28, 28′ or covers adapted to be disposed to one side of the tray or above the intra-marginal part of said tray 10 and supported by a bracket ear 29 (Fig. 1) secured to the rear of said cover and pivotally disposed between spaced ears 30 carried on the bracket 25. A clamp bolt 31 passed through said ears and provided with a milled nut 32 clamps said ears together to hold the cover in adjusted position. An elongated heating unit 34 (diagrammatically shown) comprising a heating conductor 35 disposed under and insulated from the upper part of said cover, and suitably fed with electric current, supplies sufficient heat to the food contained in dishes, containers or any desired utensils 36 or the like to keep the food at the desired temperature.

The operation of the appliance is obvious. The appliance is placed upon the table or other support 16 and the current turned on, whereupon heat rays from the heating unit will be radiated and reflected upon the vessel or dish 36 and the food therein, the tray itself preventing the burning of the table by the heating means shown over the tray.

If additional reflectors and heating means 28′ are provided, as indicated at the left of Fig. 2, care is taken that the support 16 be not of a kind to be injured by heat, or that additional protection be used, or that the heat generated be not excessive.

The domes 28, 28′ may be raised or lowered by loosing the set screw 32 in accordance with the size of the utensil 36 or the amount of heat required. If the dome 28 is raised as in the solid lines of Fig. 2, or if it be tilted to the upper position indicated by the dotted lines, food may be easily served while the utensil 36 is on the tray. The flangeless front edge 11 facilitates the easily removal of the utensils from the tray.

The standard 23 may be riveted in place or made removable from the socket 18, and the bracket 25 may be removed, thus permitting the parts to be stacked for cleaning, storage or shipping.

If the appliance is to be used for warming a room or the like, the dome 28 may be tilted as shown in the dotted lines.

My improved appliance as shown in Figs. 3 and 4 is similar to that of Figs. 1 and 2, and comprises a tray 40 having an unflanged front edge 41, and upstanding back flanges 42 and side flanges 43, said side flanges being provided with sockets 44 having vertically alined apertures 45 receiving the reduced lower end 46, the standard 47. The reflecting dome or cover 49 disposed above the intra-marginal part of said tray is provided with sockets at each end formed of a strip of the material of the dome bent to form horizontal portions 51 having vertically alined apertures 55. The heating unit here shown as an electric bulb lamp 56 having its plug 57 secured in and projecting through the upper part of said cover, supplies sufficient heat to keep the food at the desired temperature, especially when it is not desired to keep the food very hot. An ordinary electric light socket may be secured onto the plug 57.

The operation of the appliance of Figs. 3 and 4 will be easily understood from the description of the operation of the appliance of Figs. 1 and 2.

I claim:

1. An appliance comprising a heat resistant tray having upstanding flanges at the back side and both ends; spacing means for supporting the tray; a socket on a flange of the tray; a standard having a reduced lower end portion received in said sprocket; a plurality of brackets each having spaced ears and provided with a vertical bore vertically and rotatably adjustably received and positioned on said standard; a reflecting dome or cover adapted to be disposed above the intra-marginal part of said tray or to one side of the tray; a bracket ear secured to said cover and adjustably pivotally disposed between said spaced ears; and a heating unit in the upper part of said cover.

2. An appliance comprising a flanged tray; a socket formed on a flange of the tray and comprising a strip formed with horizontally outwardly, downwardly, and horizontally inwardly bent portions, the horizontal portions having vertically alined apertures to form the socket; a standard having a reduced lower end portion received in said apertures of said socket; a reflector cover secured on said standard and disposed above said tray; and a heating means in said cover.

3. An appliance comprising a tray suitable for holding food-containing dishes and the like on its mid part; a downwardly radiant heat reflecting cover supported by said tray over the mid part thereof far enough therefrom to permit the insertion and disposal of dishes or the like on the tray; and a radiant heat generating unit adjacent to the lower face of said cover; said cover and unit being near enough to the tray to keep hot the food or the like in the dishes; the intervening space between said tray and cover being unobstructed by any part of the appliance, thereby to permit the disposal of said dishes and the like on the mid part of the tray.

4. An appliance comprising a tray suitable for holding food-containing dishes and the like on its mid part; a standard mounted on a margin of the tray; a downwardly reflecting cover mounted on said standard and disposed vertically above the mid part of said tray far enough therefrom to permit the insertion and disposal of dishes or the like on the tray and near enough to the tray to keep hot the food or the like in the dishes; and a radiant heat generating unit within the upper part of said cover; the intervening space betwen said tray and cover and most of the space laterally surrounding said intervening space being unobstructed by any part of the appliance, thereby to permit the disposal of said dishes and the like on any intra-marginal part of the tray.

5. An appliance comprising an imperforate tray suitable for holding food containing dishes and the like on its mid part; means for supporting said tray spaced above a table or the like; a downwardly radiant heat reflecting cover supported by said tray over the mid part thereof far enough therefrom to permit the insertion and disposal of dishes or the like on the tray; and a radiant heat generating unit adjacent to the lower face of said cover; said cover and unit being near enough to the tray to keep warm the food or the like in the dishes; the intervening space between said tray and cover being unobstructed by any part of the appliance, thereby to permit the disposal of said dishes and the like on the mid part of the tray.

6. An appliance comprising a tray suitable for holding food containing dishes and the like; a standard mounted on a margin of the tray; feet for holding the tray spaced from a table or other support therefor; a downwardly reflecting dome or cover mounted on said standard and disposed vertically above the mid part of said tray far enough therefrom to permit the insertion and disposal of dishes or the like on the tray and near enough to the tray to keep hot the food or the like in the dishes; and a radiant heat generating unit within the upper part of said cover; the intervening space between said tray and cover and most of the laterally surrounding space being unobstructed by any part of the appliance, thereby to permit the disposal of said dishes and the like on the tray.

7. An appliance comprising a tray suitable for holding food-containing dishes and the like on its mid part and having raised flanges at its back side and ends respectively; a downwardly radiant heat reflecting cover carried by said tray and disposed over the mid part of said tray far enough therefrom to permit the insertion and disposal of dishes or the like on the tray; and a radiant heat generating unit adjacent to the lower face of said cover; said cover and unit being near enough to the tray to keep warm the food or the like in the dishes; the intervening space between said tray and cover being unobstructed by any part of the appliance, thereby to permit the insertion of said dishes and the like onto the mid part of the tray.

8. An appliance comprising a heat resistant tray suitable for holding food-containing dishes and the like and having upstanding flanges at the back side and both ends; a standard mounted on a flange of the tray; a downwardly reflecting dome or cover mounted on said standard and disposed vertically above the intramarginal part of said tray far enough therefrom to permit the insertion and disposal of dishes or the like on the tray and near enough to the tray to keep hot the food or the like in the dishes; and a heat generating unit within said cover; the space between said tray and cover being unobstructed by any part of the appliance, to permit the disposal of said dishes and the like on the tray.

9. An appliance comprising a tray suitable for holding food-containing dishes and the like; a socket mounted on a margin of the tray; a standard in said socket; a downwardly reflecting cover mounted on said standard and disposed vertically above the mid part of said tray far enough therefrom to permit the insertion and disposal of dishes or the like on the tray; and a radiant heat generating unit within the upper part of said cover; the unit and cover being near enough to the tray to keep hot the food or the like in the dishes; the intervening space between said tray and cover and most of the laterally surrounding space being unobstructed by any part of the appliance, thereby to permit the disposal of said dishes and the like on the tray.

10. An appliance comprising a tray suitable for holding food containing dishes and the like; a socket on the tray comprising a pair of horizontal portions having vertically alined apertures to form the socket; a standard having a reduced lower end portion received in said socket; a downwardly reflecting cover mounted on said standard and disposed vertically above the intra-marginal part of said tray far enough therefrom to permit the insertion and disposal of dishes or the like on the tray and near enough to the tray to keep hot the food or the like in the dishes; and a heat unit within the said cover; the space between said tray and cover being unobstructed to permit the disposal of said dishes and the like on the tray.

11. An appliance comprising a tray suitable for holding food containing dishes and the like; a downwardly reflecting cover; means for vertically adjustably mounting said cover vertically above the mid part of said tray far enough from the tray to permit the insertion and disposal of dishes or the like under the cover; and a radiant heat generating unit adjacent to the lower face of the cover; the cover and unit being near enough to said support or tray to keep warm the food or the like in the dishes; the intervening space between said tray and cover being unobstructed by any part of the appliance, thereby to permit the disposal of said dishes and the like on the mid part of the tray.

12. An appliance comprising a tray suitable for holding food containing dishes and the like on its mid part; a standard mounted on a margin of the tray; a bracket provided with a vertical bore vertically adjustably received and positioned on said standard; a downwardly reflecting dome or cover secured to said bracket and disposed vertically above said mid part of the tray far enough therefrom to permit the insertion and disposal of dishes or the like on the tray and near enough to the tray to keep hot the food or the like in the dishes; and a heat generating unit within the cover; the space between said tray and cover being unobstructed by any part of the appliance, to permit the disposal of said dishes and the like on the tray.

13. An appliance comprising a tray suitable for holding food containing dishes and the like; a downwardly reflecting cover; means whereby said cover may be mounted vertically above the mid part of said tray or to one side of the tray far enough from the tray or its support to permit the insertion and disposal of dishes or the like under the cover; and a radiant heat generating unit adjacent to the lower face of the cover; the cover and unit being near enough to said support or tray to keep warm the food or the like in the dishes; the intervening space between said tray and cover being unobstructed by any part of the appliance, thereby to permit the disposal of said dishes and the like on the mid part of the tray.

14. An appliance comprising a tray suitable for holding food containing dishes and the like on its mid part; a standard mounted on a margin of the tray; a bracket rotatably adjustably received and positioned on said standard; a downwardly reflecting dome or cover secured to said bracket and adapted when thus secured to be thereby disposed vertically above the mid part of said tray or to one side of the tray far enough therefrom to permit the insertion and disposal of dishes or the like on the tray and near enough to the tray or table to keep warm the food or the like in the dishes; and a heat generating unit within the cover; the space between said tray and the cover when disposed thereover and the space under the cover when not disposed over the tray being unobstructed by any part of the appliance, to permit the disposal of said dishes and the like on the tray.

15. An appliance comprising a tray suitable for holding food containing dishes and the like; a downwardly reflecting cover; means pivotally supporting the cover vertically above the mid part of said tray far enough from the tray or its support to permit the insertion and dispoasl of dishes or the like under the cover; said means permitting upward pivotal movement of the cover; and a radiant heat generating unit adjacent to the lower face of the cover; the cover and unit being disposable near enough to said support or tray to keep warm the food or the like in the dishes; the intervening space between said tray and cover being unobstructed by any part of the appliance, thereby to permit the disposal of said dishes and the like on the mid part of the tray.

16. An appliance comprising a tray suitable for holding food containing dishes and the like; a standard mounted on a margin of the tray; a bracket having spaced ears mounted on said standard; a bracket ear adjustably pivotally secured between said spaced ears; a downwardly reflecting dome or cover secured to said bracket ear and adapted when thus secured to be thereby disposed vertically above the intramarginal part of said tray far enough therefrom to permit the insertion and disposal of dishes or the like under the tray and near enough to the tray to keep the food or the like in the dishes; and a heat generating unit within the cover; the space between said tray and cover being unobstructed by any part of the appliance, to permit the disposal of said dishes and the like on the tray.

17. An appliance comprising a tray suitable for holding food containing dishes and the like; a pair of downwardly reflecting covers; means for supporting said covers respectively vertically above the mid part of said tray and to one side of the tray far enough from the tray or its support to permit the insertion and disposal of dishes or the like under the cover; and a radiant heat generating unit adjacent to the lower face of the cover; the cover and unit being near enough to said support or tray to keep hot the food or the like in the dishes.

18. An appliance comprising a tray suitable for food containing dishes and the like; a standard mounted on a margin of the tray; a plurality of brackets each positioned on said standard and pointing in different directions therefrom; a downwardly reflecting dome or cover secured to each bracket respectively disposed vertically above the intramarginal part of said tray and to one side of the tray far enough from the tray or its support to permit the insertion and disposal of dishes or the like on the tray and near enough to the tray or said support to keep hot the food or the like in the dishes; and a heat generating unit within the cover; the space between said tray and the cover when disposed thereover and the space under the cover when not disposed over the tray being unobstructed by any part of the appliance, to permit the disposal of said dishes and the like under the covers.

19. An appliance comprising a tray suitable for holding food containing dishes and the like; a standard mounted on a margin of the tray; a plurality of brackets each provided with a vertical bore vertically and rotatably adjustably received and positioned on said standard; a downwardly reflecting dome or cover secured to each bracket and adapted when thus secured to be thereby disposed vertically above the intramarginal part of said tray or to one side of the tray far enough therefrom to permit the insertion and disposal of dishes or the like on the tray and near enough to the tray or table to keep hot the food or the like in the dishes; and a heat generating unit within the cover.

20. An appliance comprising an elongated tray suitable for holding food containing dishes and the like on its mid part; an elongated downwardly radiant heat reflecting cover carried by said tray and mounted over the mid part of said tray far enough therefrom to permit the insertion and disposal of dishes or the like on the tray; and a horizontally elongated radiant heat generating unit adjacent to the lower face of said cover; said cover and unit being near enough to the tray to keep warm the food or the like in the dishes; the intervening space between said tray and cover being unobstructed by any part of the appliance, thereby to permit the disposal of said dishes and the like on the mid part of the tray.

21. An appliance comprising a tray suitable for holding food containing dishes and the like; a standard mounted on a margin of the tray; an elongated downwardly reflecting dome mounted on said standard and disposed vertically above the intramarginal part of said tray far enough therefrom to permit the insertion and disposal of dishes or the like on the tray and near enough to the tray to keep hot the food or the like in the dishes; and an elongated heat generating unit longitudinally disposed within the upper part of said cover; the space between said tray and cover being unobstructed by any part of the appliance, to permit the disposal of said dishes and the like on the tray.

AUGUST J. MOTTLAU.